(12) United States Patent
Arshad

(10) Patent No.: US 10,600,077 B2
(45) Date of Patent: Mar. 24, 2020

(54) ADVERTISING SYSTEM

(76) Inventor: Asad Arshad, Bradford (GB)

( * ) Notice: Subject to any disclaimer, the term of this patent is extended or adjusted under 35 U.S.C. 154(b) by 0 days.

(21) Appl. No.: 14/119,909

(22) PCT Filed: May 18, 2012

(86) PCT No.: PCT/GB2012/051126
§ 371 (c)(1),
(2), (4) Date: Nov. 25, 2013

(87) PCT Pub. No.: WO2012/160357
PCT Pub. Date: Nov. 29, 2012

(65) Prior Publication Data
US 2014/0095300 A1 Apr. 3, 2014

(30) Foreign Application Priority Data

May 24, 2011 (GB) .................................. 1108713.7

(51) Int. Cl.
*G06Q 30/02* (2012.01)
(52) U.S. Cl.
CPC ......... *G06Q 30/0246* (2013.01); *G06Q 30/02* (2013.01)
(58) Field of Classification Search
USPC .......................................................... 705/14
See application file for complete search history.

(56) References Cited

U.S. PATENT DOCUMENTS

| | | | | |
|---|---|---|---|---|
| 8,606,645 B1* | 12/2013 | Applefeld | ............. | G06T 19/006 705/14.25 |
| 2011/0218845 A1* | 9/2011 | Medina | ...................... | 705/14.11 |
| 2011/0246276 A1* | 10/2011 | Peters | .................... | G06Q 30/02 705/14.24 |
| 2012/0036006 A1* | 2/2012 | Mauro | ....................... | 705/14.42 |
| 2013/0155107 A1* | 6/2013 | Ashour | ................. | G06T 19/006 345/633 |
| 2013/0173358 A1* | 7/2013 | Pinkus | ............... | G06Q 30/0265 705/14.1 |
| 2014/0063055 A1* | 3/2014 | Osterhout | ............... | G06F 3/005 345/633 |

OTHER PUBLICATIONS

"How to Use Augmented Reality in Advertising" by Lou Dubois, Apr. 26, 2011.*
Framework for indoor video-based augmented reality applications by Khabir, Bechir, Concordia University (Canada), ProQuest Dissertations Publishing, 2008. MR45307 (Year: 2008).*
User interfaces for mobile augmented reality systems by Hollerer, Tobias Hans, Columbia University, ProQuest Dissertations Publishing, 2004. 3115354. (Year: 2004).*
A rhetoric of mobility, interactivity, and beingness for wearable augmented reality interfaces, Pedersen, Isabel, University of Waterloo (Canada), ProQuest Dissertations Publishing, 2004. NQ92023 (Year: 2004).*

* cited by examiner

*Primary Examiner* — Gautam Ubale
(74) *Attorney, Agent, or Firm* — Head, Johnson, Kachigian & Wilkinson, PC

(57) ABSTRACT

An advertising system including one or more advertisements, at least one identification means and a consumer portal, said consumer portal linked to at least one database wherein the database includes data relating to the one or more advertisements and records further data relating to the input of the identification means into the consumer portal such that cost per lead or cost per acquisition advertising models can be applied to printed advertising campaigns.

3 Claims, 11 Drawing Sheets

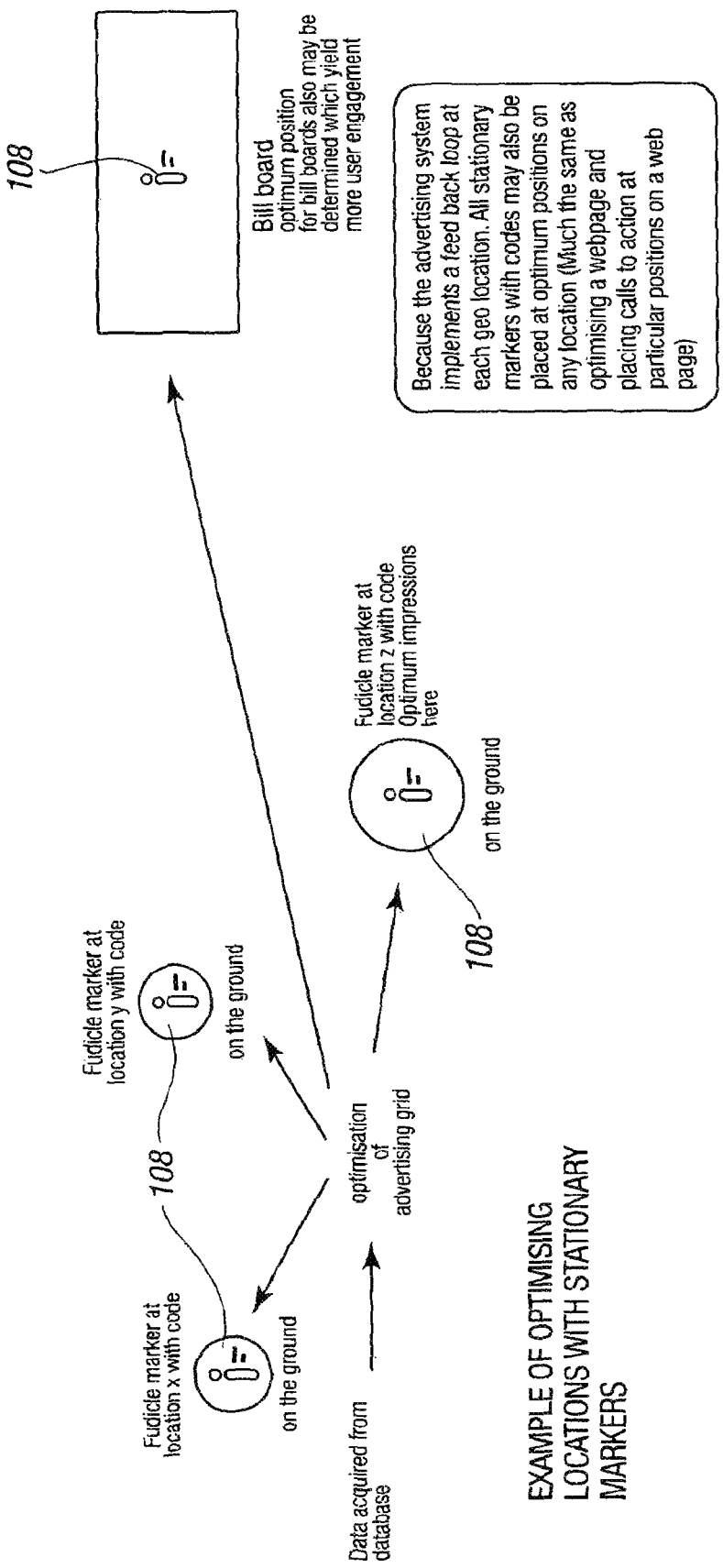
FIG. Z

ADVERTISING SYSTEM

The present invention relates to an advertising system and a method of using such a system.

Although the following description refers to an advertising system which is implemented on cars and other vehicles, it will be appreciated by those skilled in the art that the present system can be implemented on other structures such as traditional billboards, for example, as well as non-traditional items such as clothing.

Advertisers using conventional methods of publishing advertisements or 'adverts', such as printed adverts and television adverts, typically use the Cost Per Mille model (also known as Cost Per Thousand or CPM) to determine the cost of an advertising campaign. However, in using this method an estimate has to be made regarding how many potential consumers will view the advert and the number of 'impressions' that will be made on these consumers. In order to determine the CPM of an advertising campaign, the cost of the campaign is divided by the number of thousands of impressions believed to have been made. Clearly, this model is inaccurate as there is no way to count impressions.

As advertising campaigns usually include different adverts at a number of different locations, each of which will make a different number of impressions on consumers, this model becomes increasingly inaccurate as the number of adverts and/or locations increases.

Furthermore, particular locations are more expensive for the advertiser to use than other locations. This is usually due to the high number of perceived impressions the location generates. Presently, advertisers have no accurate means of determining if the expensive locations present value for money and do in fact yield higher numbers of impressions.

In an attempt to overcome these problems, advertisers have placed phone numbers on advertisements in order that a consumer may call that particular number if they are interested in the subject matter of the advert. The calls can be logged and thus the exact number of impressions can be determined. However, it is clear that increasing the number of adverts and thereby increasing the number of telephone numbers would become a prohibitively expensive system for the advertiser to run in order to determine the number of impressions each advert has made.

In contrast, internet advertising models such as Cost Per Lead (CPL) and Cost Per Acquisition (CPA) are known to avoid some of the abovementioned problems with traditional advertising in determining the number of impressions made. This is because essentially advertisers only pay the website owner or publisher for each lead and/or purchase which is made as a result of the advert making an impression. For example, the advert is usually a hyperlink to another webpage and the consumer has to click on the hyperlink if the advert has made an impression. The click is recorded as an impression being made on a consumer and a payment is made from the advertiser to the website owner accordingly.

It is a further aim of the present invention to provide a system of providing accurate data concerning the number of impressions an advertisement makes.

It is a yet further aim of the present invention to provide an advertising system which includes the advantages of the CPA and/or CPL advertising models.

It is a yet further aim of the present invention to provide advertising system wherein real time information can be gathered regarding the number of impressions made.

In a first aspect of the invention there is provided an advertising system, said system including one or more advertisements, at least one identification means and a consumer portal, said consumer portal linked to at least one database wherein the database includes data relating to the one or more advertisements and records further data relating to the input of the identification means into the consumer portal.

In one embodiment the identification means is unique to at least one advertisement. Preferably each individual advertisement includes a unique identification means.

Typically the advertisements are printed advertisements. Further typically the printed advertisements are suitable for use outside and include any one or any combination of posters, printed advertisements, printed advertisements for attachment to vehicles, clothing with advertisements printed on the same, and/or the like.

Further typically this system allows data to be collected concerning the success of an advertisement, wherein the success of an advertisement is defined as a consumer impression being created. The data concerning a consumer impression is produced when the identification means is entered or otherwise inputted into the consumer portal.

In one embodiment the advertisements are virtual advertisements. For example the advertisements are displayed in virtual and/or augmented reality. The virtual advertisements can overlay and/or be displayed adjacent to printed advertisements and/or markers such as fiducial markers, barcodes, 2D barcodes and/or the like.

Preferably the consumer portal is a website.

In one embodiment the consumer accesses the consumer portal using the internet via any one or any combination of electronic devices such as computers, internet enabled mobile devices, mobile phones, laptops, tablet PCs, augmented reality goggles/glasses and/or the like.

Preferably the consumer portal gives consumers the opportunity to purchase and/or obtain more information regarding the goods and/or services which are the subject matter of the advertisement.

In one embodiment the system or consumer portal includes an application, typically referred to as an 'app', for an electronic device. Typically the app records the input of the identification means. Further typically the device is internet enabled such that activation of the app leads to a website where the identification means can be entered.

In one embodiment the app includes an augmented reality (AR) browser. Typically, the AR browser allows virtual adverts to be displayed on the users electronic device and/or additional information to be displayed regarding printed advertisements and/or markers viewed through the AR browser.

In one embodiment the app records data relating to the entry of the identification means for transfer or access to the consumer portal and/or database means.

In one embodiment the app provides the opportunity for the consumer to purchase and/or obtain more information regarding the goods and/or services.

In one embodiment the database includes information regarding the identification means. Typically the database stores information such as any one, or any combination of; the location of the advert, the time and date the identification means was entered into the portal, the type of device used to enter the identification means, the location of the device used to enter the identification means, how the identification means appears, where the identification mean is displayed and/or the like. Furthermore the database can include social and intent data regarding the user.

In one embodiment device global positioning data is used to provide details of where the identification means and/or advertisement was observed and/or entered into the portal.

In one embodiment data concerning the location of the advert includes the location of the same in virtual and/or augmented reality.

In one embodiment interrogation of the database yields information regarding the number of impressions each advert has made. Typically the information can be presented as Cost per Acquisition (CPA) by dividing the cost of the advertising campaign by the number of purchases made. Further typically the information can be presented as Cost per Lead (CPL) by dividing the cost of the campaign by the number of portal entries.

In a favoured embodiment of the invention there is provided an advertising system, said system including at least one advertisement associated with one or more identification means and an indication to a consumer portal, said consumer portal linked to at least one database, wherein the database includes data relating to the one or more identification means and/or at least one advertisement and whereby a consumer wishing to access further information regarding the subject matter of the advertisement and/or make a purchase, accesses the consumer portal means and enters the identification means associated with said advertisement and data is recorded on the database relating to the entry of the identification means.

In one embodiment, particularly where the identification means is a link to a consumer portal, or a code or marker, the information or identification means does not have to be manually entered, it can be automatically entered, usually by the app and/or a consumer's electronic device.

In one embodiment once the identification means is entered into the consumer portal, information is sent back to the user's device. Typically the information allows the users device to display a virtual advert. Further typically the information includes an augmented reality browser and/or the like.

In one embodiment the system includes a display means on which the advertisement is displayed. Typically the display means is any one or any combination of surfaces suitable for displaying the advert, such as a t-shirt, a billboard, vehicle and/or the like. Preferably the display means is a vehicle such as a car or van and/or the like.

In one embodiment the display means is a garment, such as an article of clothing, headgear and/or footwear. Typically the garment is a shirt such as a T-shirt and/or the like.

In one embodiment the display means is an electronic display. Typically the electronic display includes an AR browser in which virtual adverts are displayed.

In one embodiment the identification means is unique to each display means. Typically, particularly if the advertisement is virtual, the identification means does not need to be visible to the consumer. The identification means can be encoded or embedded in the advertisement which in itself can be a link to the consumer portal. Selecting the advertisement can automatically enter the identification means into the portal.

In one embodiment the identification means is unique to each advertisement. Typically the identification means are one or more codes identifying the particular advertisement. Further typically the codes are a plurality of numbers and/or letters. Preferably the codes are alphanumerical codes. In one embodiment the codes are fiducial markers and/or the like.

In one embodiment the identification means includes one or more bar codes and/or the like.

In one embodiment the identification means uses near field communication technology. Typically the identification means includes any one or any combination of computer readable images, radiofrequency transmitters, radiofrequency identification (RFID) tags, which can be read by an electronic device in relatively close proximity to the same.

In one embodiment the system includes at least one computer server. Typically the server includes, or is in communication with, at least one consumer portal means. Further typically the server includes the one or more databases and/or is in communication with the one or more databases.

In one embodiment the server processes the information entered into the consumer portal means and sends the information for storage in the database. Typically the database acts as a memory whereby information concerning an advertisement, such as the number of impressions, can be retrieved.

In one embodiment the server is part of a digital network. Preferably the server is connected to the internet or other such digital network.

In one embodiment the database and consumer portal are located on and/or are provided by a computer server and/or network.

In one embodiment the consumer portal monitors the number of visits (traffic) to that portal. Typically the information regarding the number of visits is stored on the database. Further typically the database includes information regarding the number of times a virtual advert appears on a browser and not just when an advertisement is selected.

In one embodiment the system includes a plurality of consumer portals.

In one embodiment each advertisement has a unique consumer portal. Typically the advertisement is a printed advertisement and includes a unique identification means and/or an indication to a unique consumer portal.

In one embodiment a vehicle's identification plate or number plate is the identification means.

In one embodiment the database includes information concerning the owner of the location at which, or on which, the advertisement is displayed.

Typically the owners of the locations are agents, publishers and/or subscribers of the system owners. Further typically the system owners receive payment from the advertisers to display and/or publish their advertisements.

In one embodiment the database contains the details of the agents, subscribers and/or publishers and the one or more advertisements the agent displays and/or publishes. Typically the details include the location of the advertisement, the agents telephone number, email address and/or the like.

In one embodiment the location owners (hereinafter referred to as agents) and/or the system owners have a unique identification means.

In one embodiment the system owners have a unique identification means. For example an alphanumeric code and/or an augmented reality (fiducial) marker and/or the like. Typically this code can be used to access the system owners other adverts or services provided. Further typically the other services include social media services.

In one embodiment the agents pay a subscription and/or a one off fee to the system owners, in return receiving one or more advertisements which they can display. Typically the agents make a commission on each sale and/or impression their adverts make, because each sale and/or impression can be directly attributed to that agent using the identification means.

In one embodiment the server includes, or is connected to, at least one communication means. Typically, when a consumer enters the identification means into the consumer portal, the server interrogates the one or more databases for the contact details of the agent. Further typically the contact details are used to contact the agent via the communication means to inform them that an impression and/or sale has been made.

In one embodiment the agent is contacted by any one or any combination of electronic communication means such as email, SMS and/or MMS message, electronic device applications (app), social media means and/or the like. Preferably the communication includes information that an impression has been made.

In one embodiment the information that an impression has been made includes location data.

In one embodiment any one or any combination of the agent, system operator and/or advertiser is part of positive feedback loop. Typically the loop comprises a first stage where the advert is displayed and creates an impression on a consumer or potential consumer. Typically a second stage of the loop includes the consumer entering the identification means into a consumer portal typically using an electronic device such as a smart phone, iPad and/or the like. Typically the third stage of the loop includes data relating to an impression being created being stored. The loop is closed by at least part of the data concerning the impression being created being sent to any one or any combination of; the agent, subscriber, publisher, system operator and/or advertiser, and therefore a particular location, time of day, type of advert and/or the like can be identified. Thus this information is used to refine the advertising strategy and increase the number of impressions made by concentrating on the most successful areas, times and/or displaying the most appropriate adverts for those areas. For example the system can be used to establish the best times, locations and/or dates for displaying the most appropriate virtual adverts for a particular area. Augmented reality is a very effective digital means which can appear to be holographic in essence. GPS can be used to determine the most effective virtual positions for AR adverts.

It will be appreciated by those skilled in the art that incorporating users and agents into the system in such a way is a form or branch of cybernetics.

In one embodiment the agent can identify successful areas and/or locations by the number of impressions the advert makes by real-time or near real-time data fed to them. This information is particularly useful if agents are paid on a commission basis for the number of impressions made as they can be particularly efficient in targeting the areas and/or times when the most number of impressions and/or sales are made for the adverts they are displaying.

In one embodiment the advertiser has access to at least part of the information stored on the database.

In one embodiment the communication means supplies the advertiser with information regarding the number of impressions an advertisement and/or an advertising campaign containing a plurality of advertisements has made. Thus the advertiser has the information to accurately determine the CPM and/or CPL of the campaign.

The abovementioned system has the advantage that system owner and/or agent and/or advertiser can be supplied with a real time, or near real time, update of the number of impressions the advertisements they have are making.

In a second aspect of the invention there is provided an apparatus for an advertising system, said apparatus including at least one computer server means linked to a network and/or the internet, said server linked to at least one database and at least one consumer portal means, wherein the at least one database includes data regarding advertisements and stores data including the number of times an identification means is entered into the consumer portal.

In one embodiment the identification means is sent to the consumer portal via text message or other such electronic message and/or mail service means.

In one embodiment a purchase, for example a ringtone, or further information regarding the subject matter of the advert can be sent to the consumer via electronic message and/or mail service means.

In one embodiment the identification means can be used to identify and/or advertise an individual and/or the services an individual can provide. Typically an individual wears a garment, badge and/or the like bearing the identification means.

In one embodiment the identification means can be used to add the individual to a social network, dating network, and/or the like.

In one embodiment the consumer portal can be used as a website for a number of individuals and companies to advertise their services and/or goods. Typically a person will advertise any one of combination of themselves, their goods, their services, and the consumer can use the identification means to find out more on the portal.

In one embodiment the portal can be used for advertisers and/or individuals to exchange services and/or buy services.

In one embodiment the apparatus includes an augmented reality (AR) browser and/or application. Typically the consumer portal is accessed using an AR browser. In one embodiment the consumer portal is an AR browser.

In a further aspect of the invention there is provided an advertising system, said system including one or more advertisements, at least one identification means, a consumer portal and at least one database wherein the database records the input of the identification means into the consumer portal.

In a yet further aspect of the invention there is provided a method of advertising, said method including the steps of;
publishing at least one advertisement and at least one identification means associated with the same;
establishing a consumer portal linked to a database
wherein the database includes information regarding the at least one advertisement and records entry of the identification means into the consumer portal.

Specific embodiments of the invention are now described with reference to the following figures wherein;

FIG. 7 shows a schematic of how an advertising grid is optimised.

The present invention relates predominantly to outdoor advertising. Although the person skilled in the art will appreciate that this advertising system can be applied to most advertising including magazines etc. as well as online or virtual advertising. One major advantage the current system has is that it can quantify the actual number of visual impressions a particular advert receives by implementing a system incorporating a wireless internet terminal and website, which in turn connects to a central server. The website uses a unique identification means to tell apart one outdoor or virtual advert from another. The server is usually equipped with a database which contains information including the advertisement and the location of the same.

Furthermore, agents, publishers and/or advertisers can use the impression information to positively feed back into the advertising strategy, thereby refining the same and generating more impressions and ultimately sales. In addition, specific consumers or audiences can be targeted.

Figure 1:
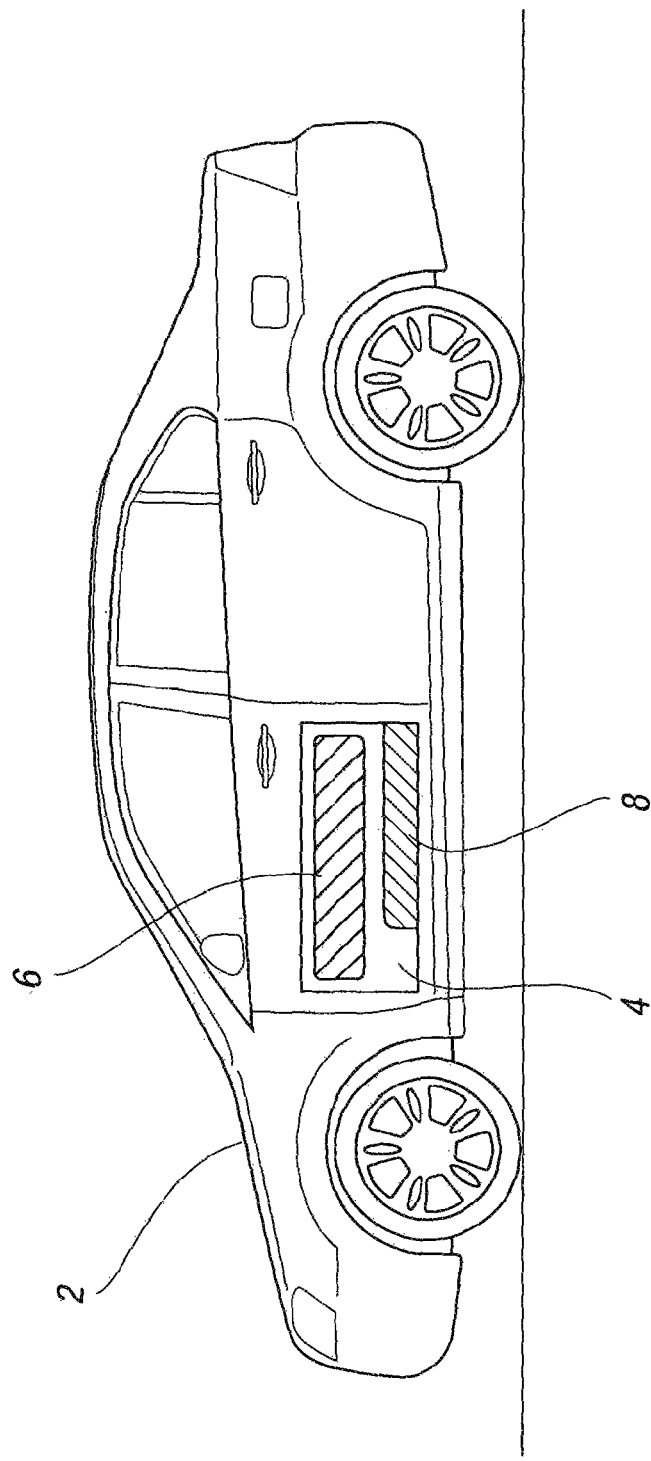
FIG. 1 shows a vehicle including an advertisement in accordance with an embodiment of the invention.

Turning to FIG. 1 there is shown a car 2 with an advertisement or advert 4 attached to the side. The advertisement 4 is a printed advertisement which is attached to the door of the car using conventional magnetic strips (not shown).

The advert 4 includes an image 6 of the goods being promoted and details 8 of a consumer portal, in this example a website where more information about the goods can be obtained.

If the advert makes an impression on the potential consumer, they can enter the website address into their PDA, internet enabled mobile/cell phone, iPad® and/or the like. Once the webpage is loaded the potential consumer has the opportunity to input identification means, in this example a short alphanumerical code into the website.

The identification means can be a number of codes and can be unique to the particular advert. For example the unique code could be the vehicle's registration number, or letters and/or numbers displayed on the car or printed on the advert itself.

Entry of the identification code allows the user to view the further information regarding the product and/or to purchase the same. The entry of this information is recorded in a database and is representative of an impression being made on the consumer.

Typically the person who owns the car 2 is an agent of the owner of the system or the advertiser. In the present example the agent owns the car 2 and pays the system owner a yearly subscription fee in order to receive adverts 4. In return for displaying the adverts on his car, the agent receives a commission, usually a small percentage of the sale of the goods displayed, or payment commensurate to the number of impressions made, for example payment each time his number plate is entered into the website portal. This system also has the advantage that multiple adverts could be displayed on the car and, providing the identification means and/or the consumer portal 8 is unique, the agent will be paid for each individual impression. Furthermore, the owner of the system and/or advertiser obtains accurate data concerning the number of impressions each advert has made.

The person skilled in the art will appreciate that the same system could be applied to traditional billboards and printed advertisements wherein the identification means and the direction to the consumer portal are displayed on the billboard poster or on the billboard frame itself.

In some embodiments the consumer portal website or webpage is unique to the advertisement or to the location at which it is displayed. In such embodiments the website or webpage address is unique and therefore can function as the identification means.

In this particular example, once an impression is made and recorded, a message is sent to the agent's mobile phone (not shown) indicating that an impression has been made. The agent thereby has real time, or near real time information, which can be used to identify locations which obtain the most number of consumer impressions.

In this example also the advertiser has limited access to the database. The advertiser can therefore obtain information regarding the success of a particular advertising campaign.

Figure 2:
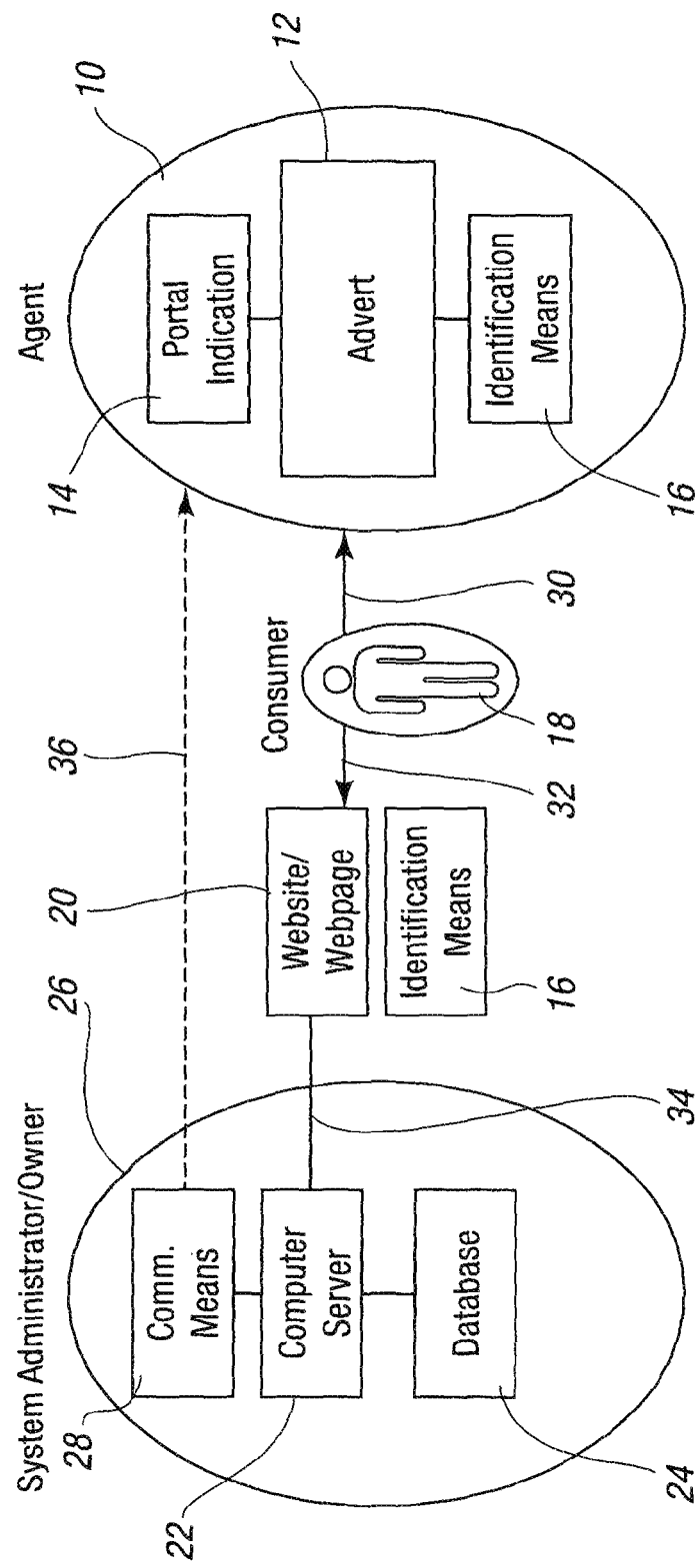
FIG. 2 shows a schematic detailing the system in operation.

FIG. 2 shows a schematic of how components of this particular system are linked to together. The agent 10 displays one or more adverts 12 at a suitable location, such as on his car/van, billboard, the window of his home, or even in his place of business, if a number of potential consumers are likely to view the same. Each advert in this example is associated with an indication 14 to a consumer portal, which is a website or webpage 20. The indication 14 can be printed on the advert or can be displayed near to the advert 12. Depending on the system configuration, a single website can function as a portal for a number of advertisements or each advert can have an individual portal. The indication 14 is usually a web address.

The consumer 18 viewing the advert 12 either makes a note of the website 20 or, more commonly, will use an internet enabled device, such as a laptop, web-book, mobile phone, smart phone, PDA, tablet, iPad and/or the like to view the website 20 directly. On viewing the website/consumer portal 20 the consumer is asked, or is provided with the opportunity, to enter the identification means 16 to view information and/or further information regarding the subject matter of the advert 12. Entering the identification means 16 can also give the consumer the opportunity to make an online purchase the goods and/or services displayed on the advert.

The identification means is usually a unique code. For example the identification means could be the number plate of the agent's car. In this particular example, if the agent wished to display multiple adverts 12 on his car, each advert would include a unique portal indication. This is because there is only a single identification means (the number plate) and therefore in order to record consumer impressions for different adverts concerning different subject matter, the entry points for the identification means will be unique to each advert.

Other identification means can be used, for example short combinations of letter and/or numbers and/or near field communication methods. If a unique identification means are associated with each advert it is possible to configure the system so that a single, or small number of portal indications, is displayed.

In this example the website is controlled by the advertising system administrator and/or owner 26 and it is located on a server 22 connected to the internet. The website 20 is one of a number which can be hosted on the computer server 22 for this purpose. The entry of the identification means 16 into the website 20, is recorded as data relating to an impression being made on a consumer 18. This information is processed by the server computer 22 and stored on a database 24. The database also includes other information, for example details of the agent (name, address etc.) which is linked to the identification means and/or the website that particular agent uses. The database 24 can also be interrogated to yield information regarding the best performing agents who are generating the most number of user impressions and/or the number of impressions an advertisement or an advertising campaign is making.

The agent 10 usually pays a fee to a system administrator/owner 26 to receive the adverts 12 which they display. The agent 10 then receives a payment or commission in relation to the number of impressions (the number of times the identification means is entered into the portal 20). It is therefore envisaged that a system owner/administrator can offer the use of their advertising system to providers of goods and/or services (the advertisers) wish to advertise the same, in exchange for a fee. The size of the fee will relate to the number of adverts and/or the length of time the adverts are to be displayed.

Returning to the server 22, in this example as the information concerning the consumer impression is processed by the server a communication means 28 linked to the same sends a message (usually via email, text message, instant messenger and/or the like) to the agent 10 informing them that an impression has been made. The message usually includes the time and date the identification means is entered into the website which is indicative of when the consumer impression was made.

The agent can use this information to identify the locations and/or times that generate the most consumer impressions. In addition, particular adverts which are successful at generating a number of impressions at certain locations can also be identified from this information and particular consumers targeted.

From FIG. 2 it can be seen that the consumer and agent are integral parts of a positive feedback loop or system. In the first part the consumer 18 looks at the advert 12 and gathers the information 30 which makes an impression. The consumer inputs 32 the identification means 16 into the portal 20 and a record is made of this information 34 in the database 24. This information is fed back 36 to the agent so their strategy for targeting consumers and generating impressions can be refined. Thus the transfer of information along channels 30, 32, 34, 36 involves cybernetics in a positive feedback system.

Figure 3:
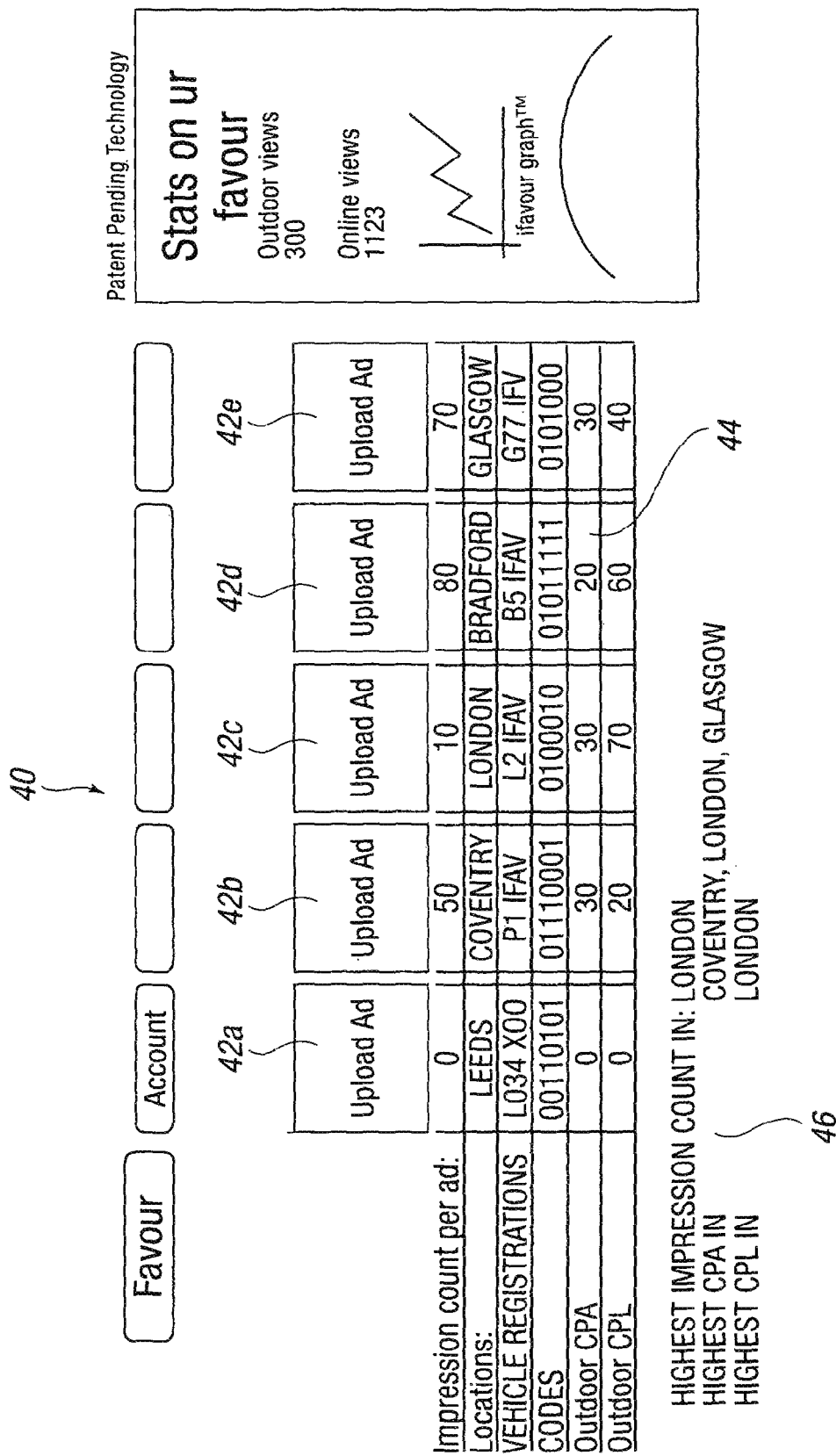
FIG. 3 shows a webpage including database information in accordance with one embodiment of the invention.

Turning to FIG. 3 where there is shown a webpage 40 which provides information from the database to the user or system controller. It will be appreciated by those skilled in the art that advertisers could also be shown this information or selections therefrom using a separate login. Boxes 42a-42e show the adverts which are currently being displayed. Underneath each advert is a table 44 which includes information regarding the impression count for each ad, locations and number plates of the cars, the alphanumerical codes and the CPA and CPL data. Summary data is provided at the bottom of the page 46 which shows where the highest number of impressions which have been made and where the highest CPA and CPL figures have been achieved.

Figure 4:
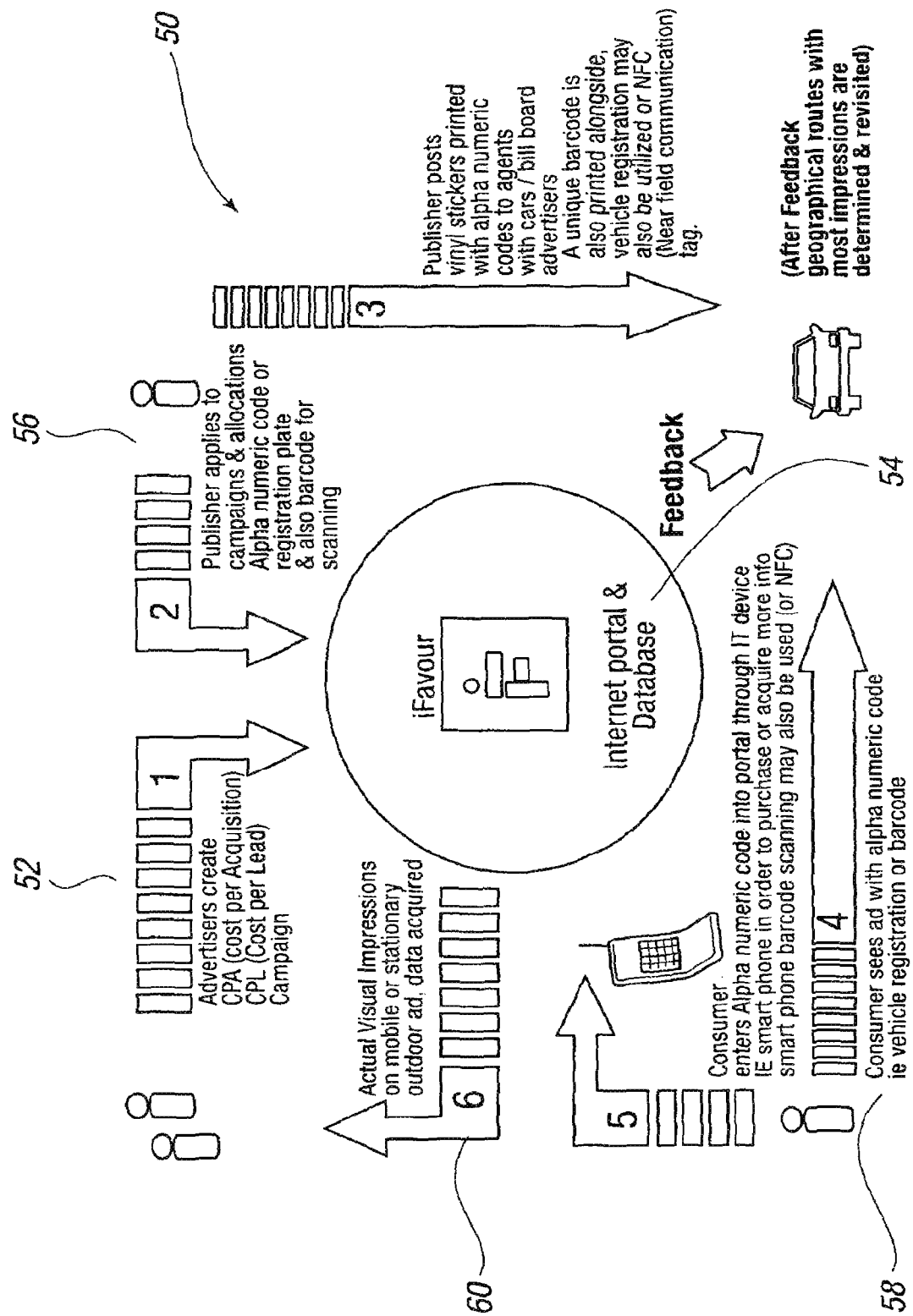
FIG. 4 shows a further detailed schematic of the system.

FIG. 4 shows a schematic 50 of the typical process implemented in obtaining such data. Firstly advertisers create a campaign 52. This is submitted to the system user, in this example the iFavour™ website 54. Publishers and/or agents 56 apply to be part of campaigns and obtain the advert and identification means. When the consumer sees the advert and an impression is made the web portal 54 address is entered into an internet enabled device 58 and further information or a purchase is obtained. This relevant data is collected 60 and the advertiser 53 can view the success of the campaign and pay the system user or controller accordingly.

Near field communication (NFC) technology can also be employed to enhance the present invention. For example at a networking event or exhibition an 'advert' could replace the traditional advertising business card and/or the business tag pinned to a garment. The card or tag could include identification means incorporated as a radio frequency chip and/or a unique bar code. If more information regarding the individual, business or services is desired a NFC device, such as a mobile phone, can scan and the tag and access the consumer portal. Thus the success of networking at various events can be measured. Additional advantages include real time data, reducing the cost of printing cards, reducing loss of distributed cards, more eco-friendly, a capped cost of a tag rather than having to reorder endless numbers of business cards and so forth.

Another application is the monitoring the success of field sales agents (for example door to door agents) at various geographical locations. Success may be measured simultaneously via one portal for a sales company and thus monitored in near real time when a potential consumer scans the agents tag and/or promotional literature left by the agent. Thus the system can help in identifying target markets, ensuring field sales agents generate enough leads, and re-targeting areas of interest.

Figure 5A:
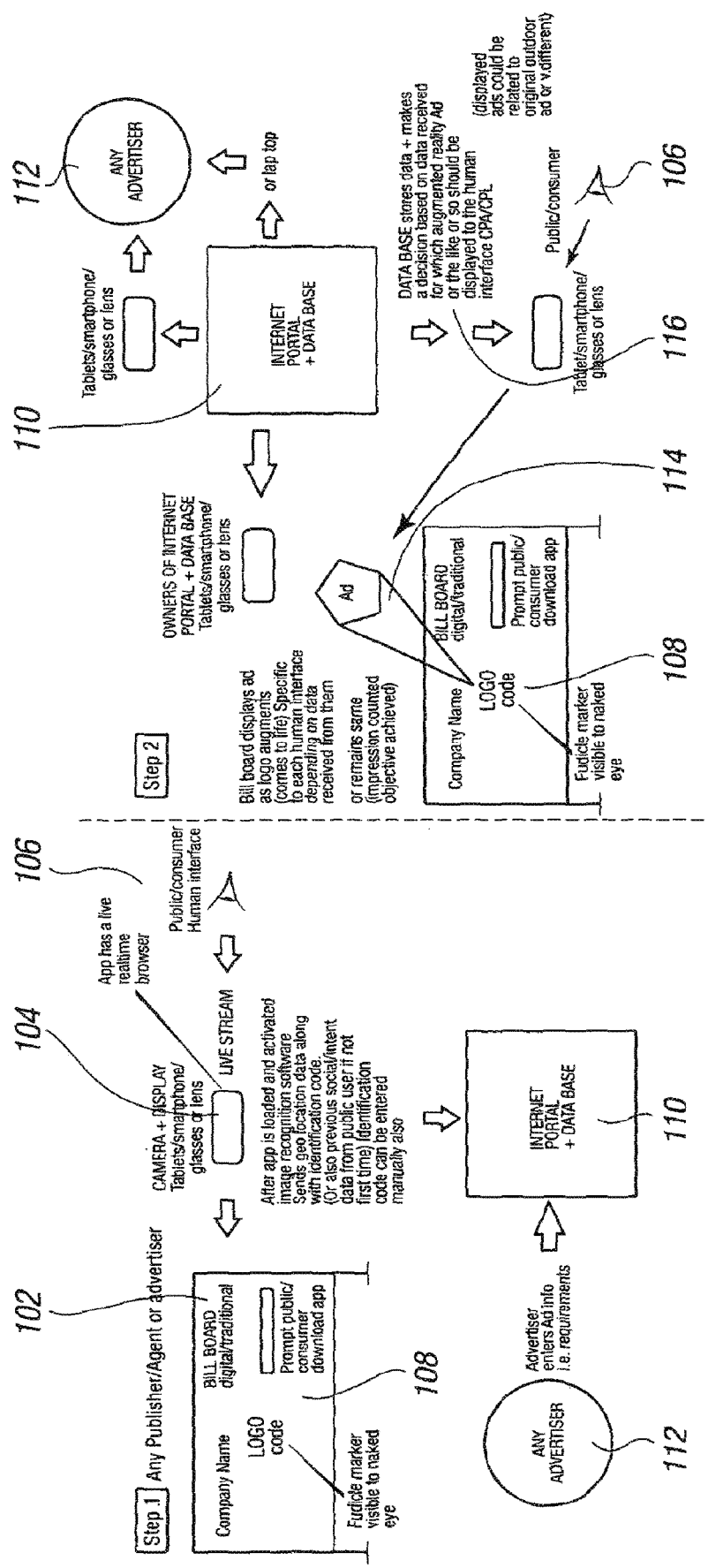
FIGS. 5a-5c show diagrammatic representations of one embodiment of the invention which is implemented using augmented reality.
Figure 5B:
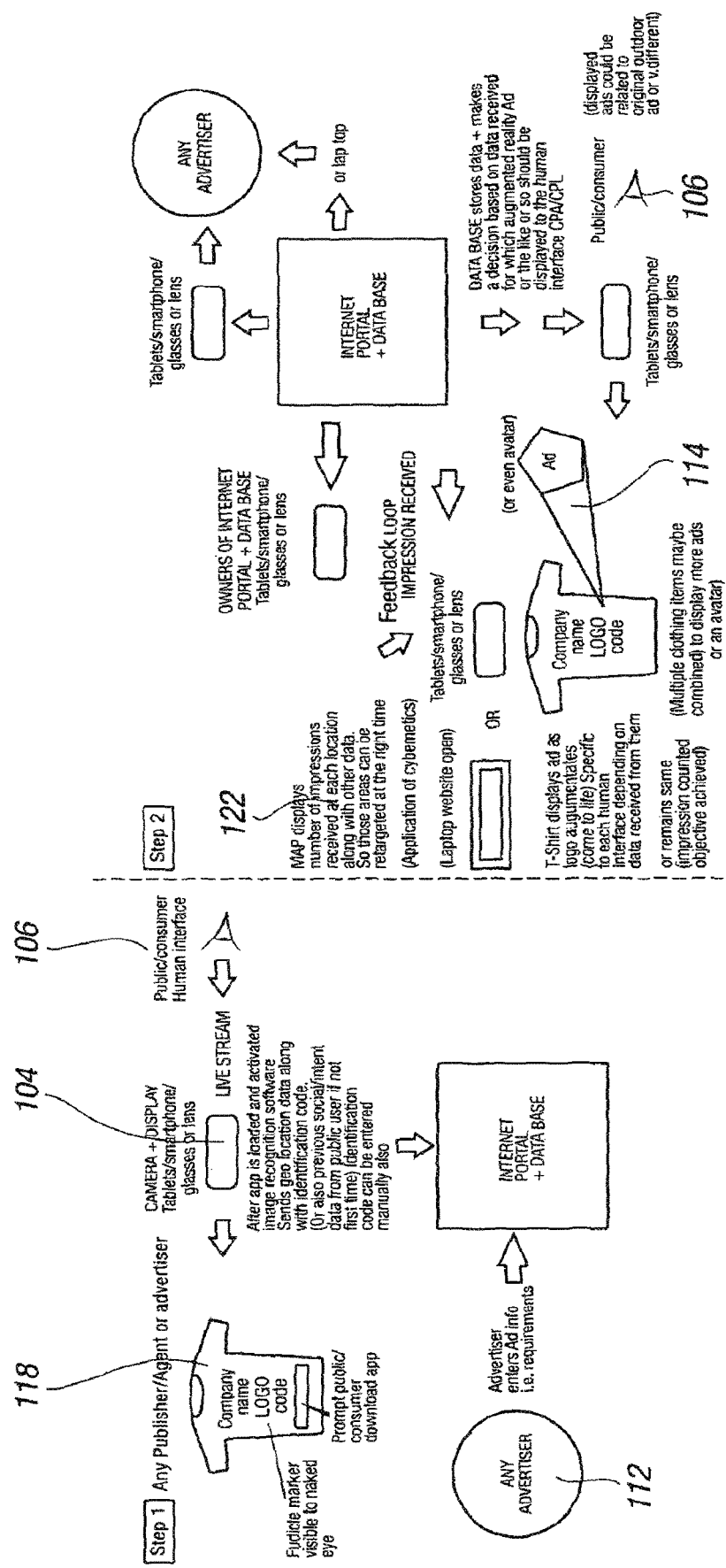
Figure 5C:
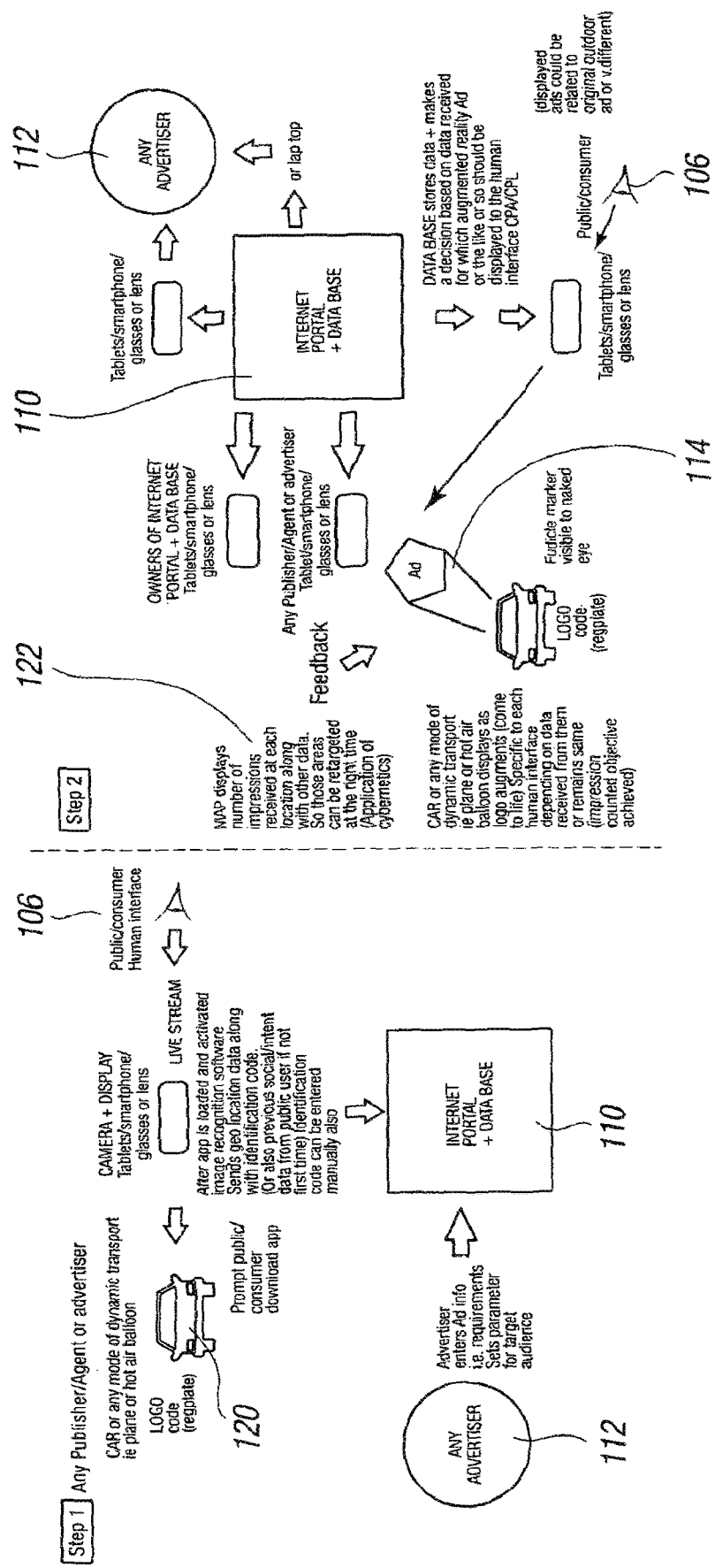

A further embodiment of the invention is shown in FIGS. 5(*a*) to 5(*c*) wherein the application of an alternative reality browser is used. Turning firstly to FIG. 5(*a*) where there is shown a billboard advertisement 102 which can include a traditional printed advertisement or can be overlaid with a virtual or augmented reality (AR) advertisement. The AR advert can be generated specifically to the viewer's/consumer's AR browser 104 configuration or personal preferences Initially, the potential consumer 106 sees the outdoor and/or online virtual advert. In this example the advert includes identification means 108 in the form of a fiducial marker, which could equally be a registration plate for a car, any alpha numeric code, and/or any other computer readable format. The identification means is presented in a pre-programmed format to the portal and data base 110, and the consumer's electronic device is prompted to either activate or to download an app for the appropriate device or enter website/consumer portal directly. Such devices include smartphone's, iPad and other tablet computers or even appropriate glasses in the near future.

In addition the app or program may already be active in a visual or AR browser. Furthermore, details of the user's social network, or other such social networking data can be incorporated and/or data exchanged. For example to show which adverts or products a potential consumer 'likes'. This allows users to socially interact in the real world in real time, static or dynamic). NFC technology may also be used to identify advert.

Once the visual browser is active, all or some of the above identification means are recognised via image recognition software or the consumer enters the details manually.

In this example the device has global positioning (GPS) enabled so the location is geo tagged, with time and date along with other data including the identification means of the advert. Also, if any other data is available indicating the social intent of the consumer from previous uses, this is now sent to internet portal and database 110.

The data is received at internet portal and logged in the database. Now the database can be interrogated and appropriate data sent back to users device interface. Depending on what the advertiser's 112 requirements are, more information can sent back regarding the goods and/or services.

Typically the database acts as a memory and decision maker through as a memory whereby information concerning an advertisement such as a number of impressions can be retrieved as a decision maker depending on social and intent data, the database stores social and intent data of the user from previous data acquisition of the user which enables the database to deliver a more targeted advert to the user.

Further typically the information regarding the number of visits is stored on the database along with any social and intent data and any other data which is acquired via data mining techniques In addition, fiducial markers or similar such markers can be used to augment the data with appropriate targeted advert content. Also the cpl/cpa data can be gleaned from the potential consumers interaction with the augmented advert 116. For example the consumer may choose to share this advert 102 on a social network/networks. In all cases a definitive impression count is known along with other data. Augmented or virtual reality adverts are particularly attractive because they are not constrained by the dimensions of conventional print advertising. The advert can be animated and appear to come to life 114 when viewed through the browser.

This system is also suitable for non-static display means such as display on t-thirts 118, cars (stickers) 120 as depicted in FIGS. 5(*b*) and 5(*c*) respectively. Other adverts such as on hot air balloons are possible and display as virtual outdoor ads may be attractive when viewed through a browser. Often when markers such as a fiducial marker and/or other unique identification means are displayed selecting the same using an electronic device will display the advert.

The advantages are that advertiser or publisher of the outdoor advert or even the online advert acquires definitive data on the number of impressions, which can be attributed to that particular advert and/or advert location. Hence it is possible to run an integrated online and offline advertising campaign, which is more targeted. This will be particularly important in the future because the devices implementing AR, such as AR glasses, are highly unlikely to be removed by users and thus a normal outdoor screen displaying adverts can appear to be a video screen displaying multimedia content. The advertiser therefore can advertise to the AR enabled consumer and the consumer viewing the conventional advert.

Currently, free floating advert images within augmented reality browsers makes the problem of attributing impressions to outdoor adverts worse. The present advertising system ensures outdoor ads are seamlessly integrated in the visual browser and not ignored, also if augmented reality ads are displayed; it is preferable that they are displayed in a position on or near the fudicle marker. Hence creating a more real landscape of adverts which are online and outdoor, seamlessly integrated and the system is able to account for each impression.

Another advantage of this advertising system is on billboards located on long routes where no electricity is available. Conventional systems can by no means ever achieve an accurate impression count and applying techniques such as eye tracking technology would commercially be unfeasible and unrealistic on remote outdoor media. However, using the present invention, billboards can now also have an accurate impression count attributed, along with added advantages of displaying augmented reality ads that can either be given to cpl/cpa data and also highly targeted to the consumer/public (depending on social & intent data geo tagging etc.).

Eye tracking technology has been implemented on its own, on billboards or combined with digital screens. However, not every billboard, vehicle and/or clothing can accommodate such a device. Not only is it not commercially feasible, some billboards on long highways have no means of electricity due to distance from electricity supply. Hence no digital board or no known device can be installed at such locations. It is therefore yet a further aim of the present invention to provide advertising system which converts ordinary non digital billboards on long highways with no means of electricity with a means to count impressions and provide targeted social or intent ads specific to the consumer. This can include social data or intent data.

Furthermore, an integrated online/outdoor impression counting advertising system inherently has far more transparency for the sake of acquiring data on impression counts. This is attractive to the advertiser who wishes to run the most cost effective advertising campaign possible. In the examples given in FIGS. 5(*b*) and (*c*) a visual map 122 with the data acquired is plotted for the advertiser/publisher/agent or owners of the advertising system. Displaying the spread of adverts and there impression counts in real time (along with other data such as geo tagging date time, number of impressions at particular locations etc.) is clearly an advantage. All the above mined data formulates visual streams on the map of cpa/cpl for both online and outdoor adverts. The present invention also provides for simply determining the number of impressions on outdoor ads without having to super impose a virtual advert on the original advert.

Furthermore, another added advantage to outdoor adverts can now be optimised with regard to optimum viewing locations within the grid of the advertising system, much like a web page is optimised for advert location on the webpage. Optimisation is achieved via the application of a feedback loop.

Such an advertising system also has the benefits of reducing the carbon foot print of each country, since adverts can so easily be placed on any outdoor medium and also geographically anywhere that displays the unique identifier along with a fudicle marker or such of the advertising company. Since each advert is a targeted advert, multiple adverts can be displayed to each person/consumer from one fiducial marker (with) and incorporate a unique identifier. The marker and/or identifier may belong to advertising company mentioned or another company.

It is envisaged that potentially a large screen bearing a large fiducial marker with identifier code can be implemented instead of traditional large projector screen or digital screen for outdoor or indoor cinemas. Since the fiducial marker augments, it can augment to any live feed, super imposed on the screen i.e. movie or online video feed, and each human interface with the device can view their own feature all on one screen according to their own personal preference. Again the estimated number of viewers becomes more accurate. This model can be reduced in size and the same principle applied for home cinema because even television commercials don't have an accurate count of impressions created as some viewers walk away/turn off once a commercial starts. This example will find particular application in the future when eye pieces are commonly interfaced with human society and visual (AR) browsers are commonplace.

Figure 6A:
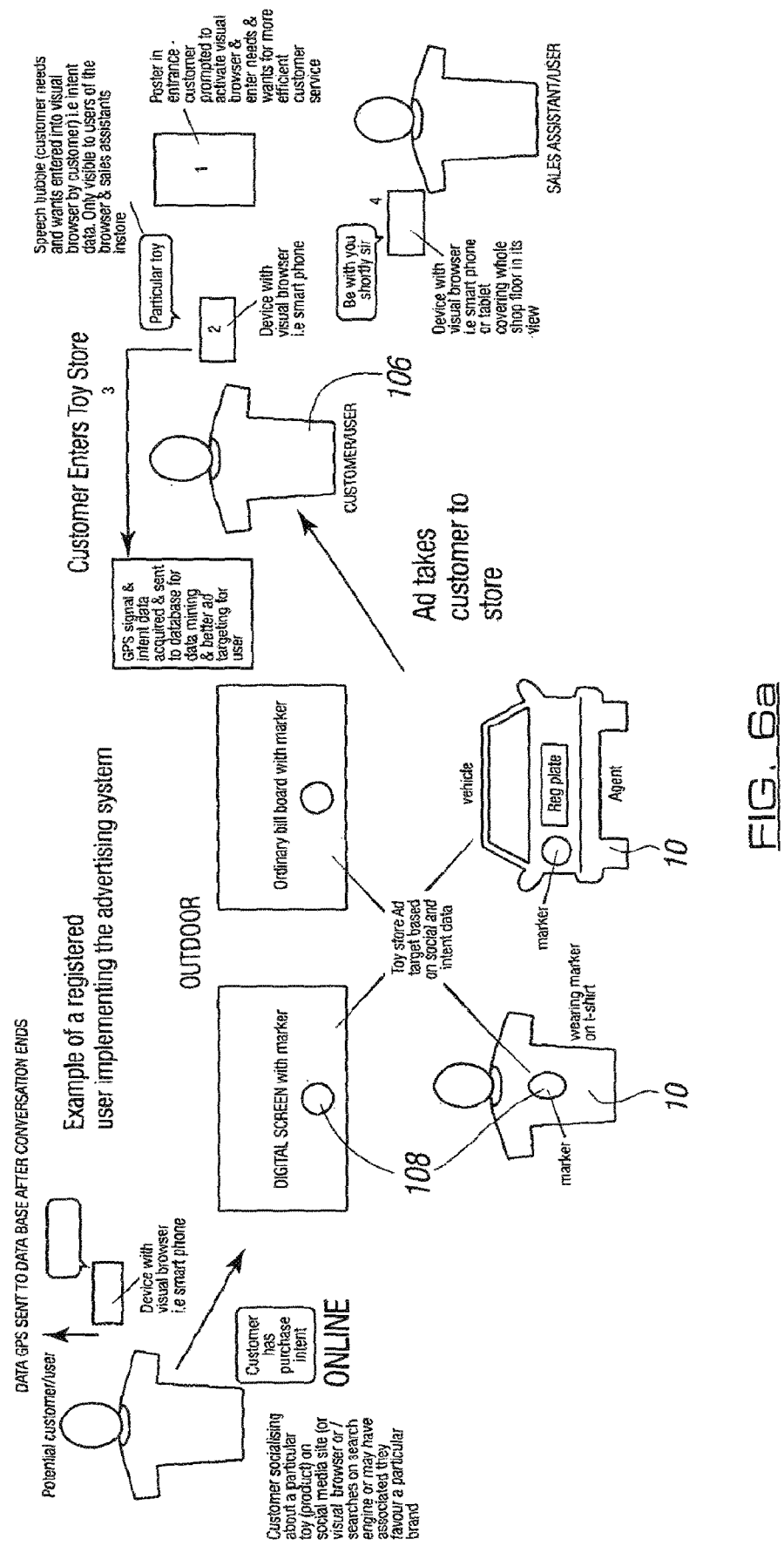
FIGS. 6a-6c show diagrammatic representations of embodiments of the advertising system.
Figure 6B:
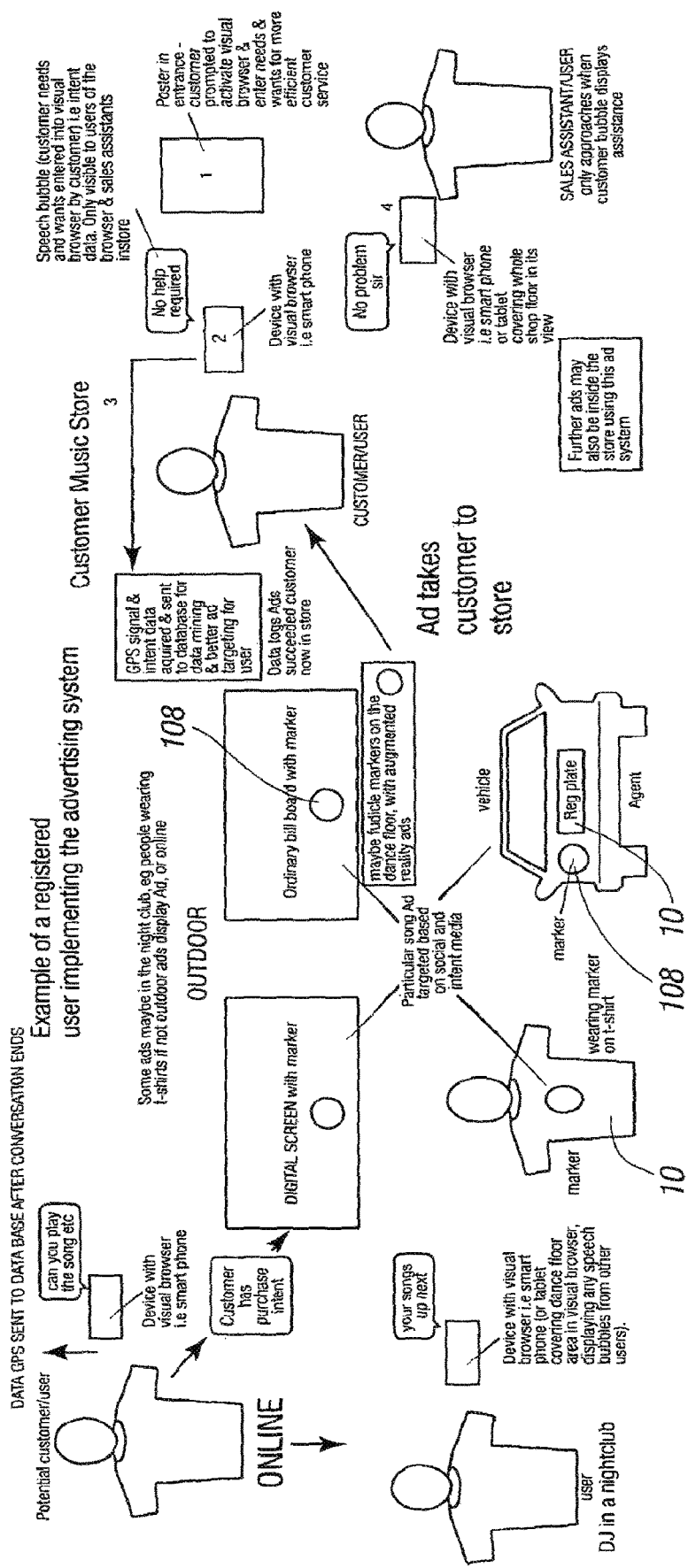
Figure 6C:
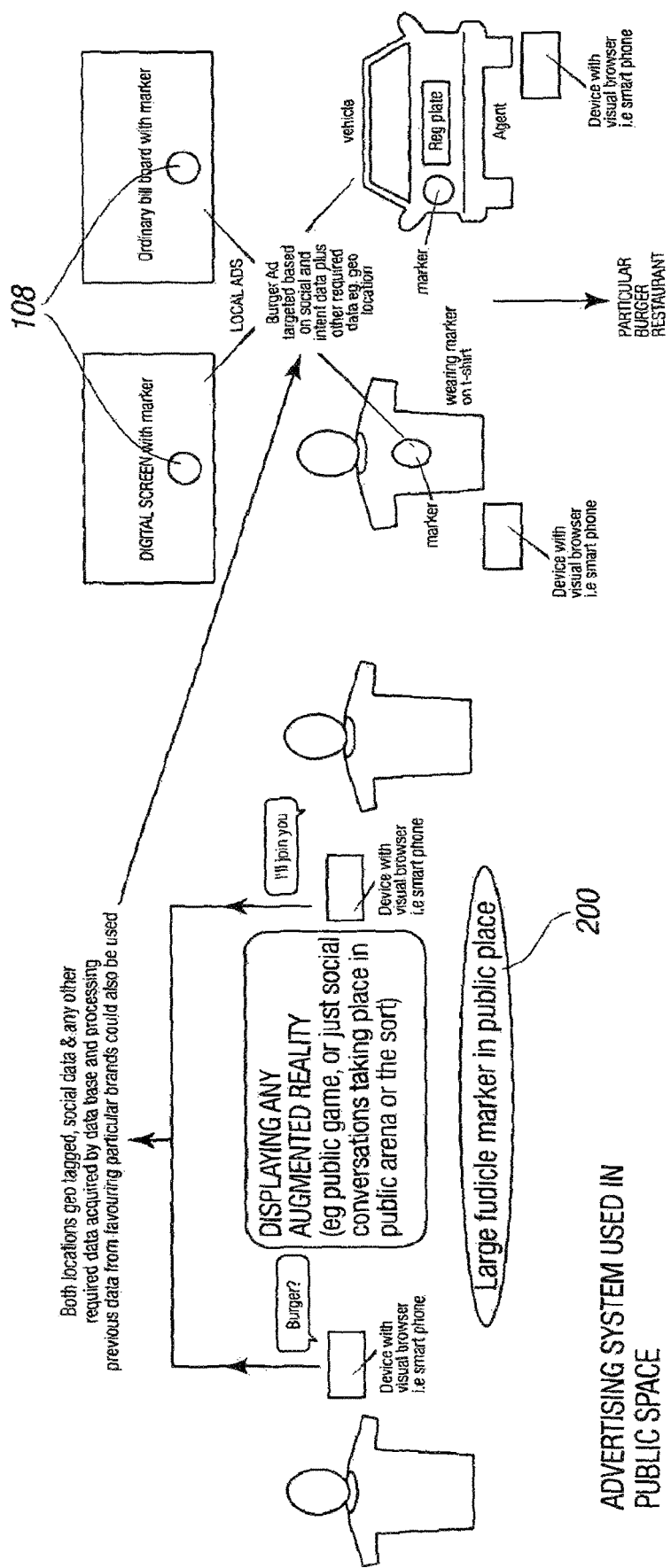

Advertisements shown during television commercial time are also not reaching all the targeted audience as majority of viewers will get up and walk away, or can simply just choose to forward the commercial during playback. This again proving a method with is slowly becoming outdated and inaccurate. The more targeted augmented reality ads or thereof can be supplied to the user viewing the advert. Hence increasing the efficiency of the whole advertising system seamlessly integrating online and outdoor adverts provided by the owner of the system Turning to FIGS. 6(*a*) to 6(*c*) there is shown an example of implementations of the advertising system. FIGS. 6(*a*) and (*b*) shows one example where an outdoor advertising method is used such as digital screens or corresponding billboard advertisements, car stickers and t-shirts. FIG. 6(*c*) is an outdoor display in augmented reality (AG) with a large fiducial marker 200. The advertiser can link into this using local adverts as described previously.

FIG. 7 shows a schematic of optimising locations with stationary markers. Typically the markers are fiducial markers on the ground and/or on billboards or the like. Because the system implements a feedback loop at each geo location the markers can be placed at optimum locations or optimum positions at any location, much in the same as optimising advertising on a webpage.

By applying cybernetics, it is easy to comprehend and define the functions and processes of this system, this system has targets that partake in circular, causal chains, these move from action (user engaging with advert) to sensing (any device accommodating a visual live feed browser for this advertising system incorporating image recognition program and augmented reality) to comparison with desired goal (database), and again to action (user engages with ad further after targeted advert appears CPL/CPA or acquires more data regarding advert. Hence making the advertising system more efficient as optimum impressions on both on-line and offline can be delivered to target audiences at all locations whether static or dynamic, on any traditional or non traditional advertising medium (radio adverts negated from this system). Outdoor adverts can now be optimally located geographically via using this advertising systems technology both static and dynamic, i.e. optimising on locations within the systems grid.

The invention claimed is:

1. An advertising system, said system comprising:
a plurality of billboard and/or printed advertisements,
a computer server connected to the internet, said computer server including or linked to a database,
the database containing a plurality of virtual advertisements to be displayed in an augmented reality browser on user's portable electronic devices,
unique identification means in the form of unique alphanumeric codes, said unique alphanumeric codes associated with billboards and/or printed advertisements wherein the identification means and direction to an augmented reality consumer portal are displayed on the billboard poster or on the billboard frame itself, and
an augmented reality browser consumer portal, said augmented reality browser consumer portal is an augmented reality browser application or app linked to the computer server and database and accessed by a user's portable electronic device using said augmented reality browser consumer portal,
the database including data relating to the location of each unique alphanumeric codes and relating to the input of the unique alphanumeric codes entered into the augmented reality browser consumer portal using said portable electronic device thereby recording impression data, and
wherein a one of said plurality of virtual advertisements is displayed to the user on their portable electronic device via the augmented reality browser consumer portal relating to the location of each alphanumeric codes entered,
said one of said plurality of virtual advertisements selected from the database by the computer server based on location data, including matching the stored location of the alphanumeric code entered and global positioning system data available on the user's portable electronic device, and
wherein the impression data is combined with the alphanumeric code and with user global positioning data to match and present augmented reality (AR) advertisements to a user suitable for that location based on the alphanumeric code, GPS and impression data recorded at that location.

2. An advertising system according to claim 1 wherein the app is linked to a website to record input of the identification means.

3. A system according to claim 1 wherein the unique alphanumeric identification means is on a billboard display or on the billboard frame itself.

* * * * *